United States Patent [19]

Nilsson et al.

[11] 3,933,224

[45] Jan. 20, 1976

[54] FORK LIFT TRUCK

[75] Inventors: Jan Ove Lennart Nilsson, Billesholm; Carl Nils Erik Risberg, Eslov, both of Sweden

[73] Assignee: Stockamollan AB, Eslov, Sweden

[22] Filed: May 30, 1973

[21] Appl. No.: 365,307

[52] U.S. Cl. ............... 187/9 R; 180/64 R; 180/77 S

[51] Int. Cl.[2] ....................... B60K 5/04; B60K 5/10; B60K 26/00; B66B 9/20

[58] Field of Search ........... 187/9 R, 9 E; 180/64 R, 180/64 L, 64 M, 77 S, 89 R; 280/106; 214/390–396, 670–674

[56] References Cited

UNITED STATES PATENTS

| | | | |
|---|---|---|---|
| 858,108 | 6/1907 | Sanchis | 280/106 X |
| 1,349,292 | 10/1920 | Overlin | 214/392 X |
| 2,384,890 | 9/1945 | Coldwell | 180/77 S |
| 2,653,678 | 9/1953 | Lehrman | 187/9 |
| 3,039,637 | 6/1962 | Akrep | 214/670 |
| 3,195,913 | 7/1965 | Hallsworth | 180/77 S X |
| 3,216,598 | 11/1965 | McKee et al. | 214/660 |
| 3,272,364 | 9/1966 | Mindrum | 187/9 X |
| 3,347,558 | 10/1967 | Grimes et al. | 180/77 S |
| 3,506,092 | 4/1970 | Shinoda | 187/9 |
| 3,721,318 | 3/1973 | Warrender | 180/77 S X |
| 3,773,132 | 11/1973 | Gawlik et al. | 180/64 R |

OTHER PUBLICATIONS

Whitehall, B., *Forklift Trucks:Does the Driver Sit in the Best Position*? Mechanical Handling, 56(3), p. 71–74, Mar., 1969, TA1C34.

*Primary Examiner*—Evon C. Blunk
*Assistant Examiner*—James L. Rowland
*Attorney, Agent, or Firm*—Browne, Beveridge, DeGrandi & Kline

[57] ABSTRACT

A fork lift truck comprising a chassis carried by wheels, power and transmission means, steering and control means, and a hydraulic fork lift. The chassis is in the shape of an arch, the highest point of which is located between the wheels and above the level thereof. The power means is positioned between the wheels and underneath the highest point of the arch, while the driver's seat and the steering and control means are positioned above said arch and are horizontally rotatable as a unit.

4 Claims, 3 Drawing Figures

FORK LIFT TRUCK

The present invention relates to a truck comprising a chassis carried by pairs of wheels, a drive, transmission means, a hydraulic fork lift at one end of the chassis, a driver's seat, and steering and control means, the chassis being in the form of an arch, the highest point of which between said pairs of wheels is located above the level of said wheels.

Fork lift trucks are fitted at their front end, i.e. the end toward which the driver's seat normally is facing, with a framework which extends beyond the highest level of the truck and the driver's head and along which the fork is vertically movable. In the lowermost position of the fork and in intermediate positions up to a highest position, loads can be picked up and deposited by the fork, and the fork lift truck thus constitutes a versatile device for the rapid handling of loads in both vertical and horizontal directions. The framework comprises power and transmission means and frequently also a number of relatively displaceable sections so that the framework can be extended or shortened with a view to changing the lifting height of the truck. However, the framework blocks the driver's view, and the driver therefore drives the truck backwards in order to have a clear view of the working area. The driver will thus always sit in a half-twisted unnatural position which is extremely uncomfortable and over longer distances will impair his driving skill. These trucks are frequently driven on public roads, even though their construction makes them highly unsuitable in this respect. The framework in front of the driver's seat is sufficiently view-blocking to make the vehicle dangerous to road traffic.

To eliminate these shortcomings, the truck according to the present invention is characterised in that the drive is disposed underneath the highest point of the chassis arch between the chassis ends and the pairs of wheels, and in that the driver's seat and the steering and control means are disposed above said chassis arch and pivotally mounted in horizontal direction.

These and other features of the present invention as well as the advantages gained thereby will appear from the following description of a preferred embodiment of the invention, reference being had to the accompanying drawings.

Figure 1:
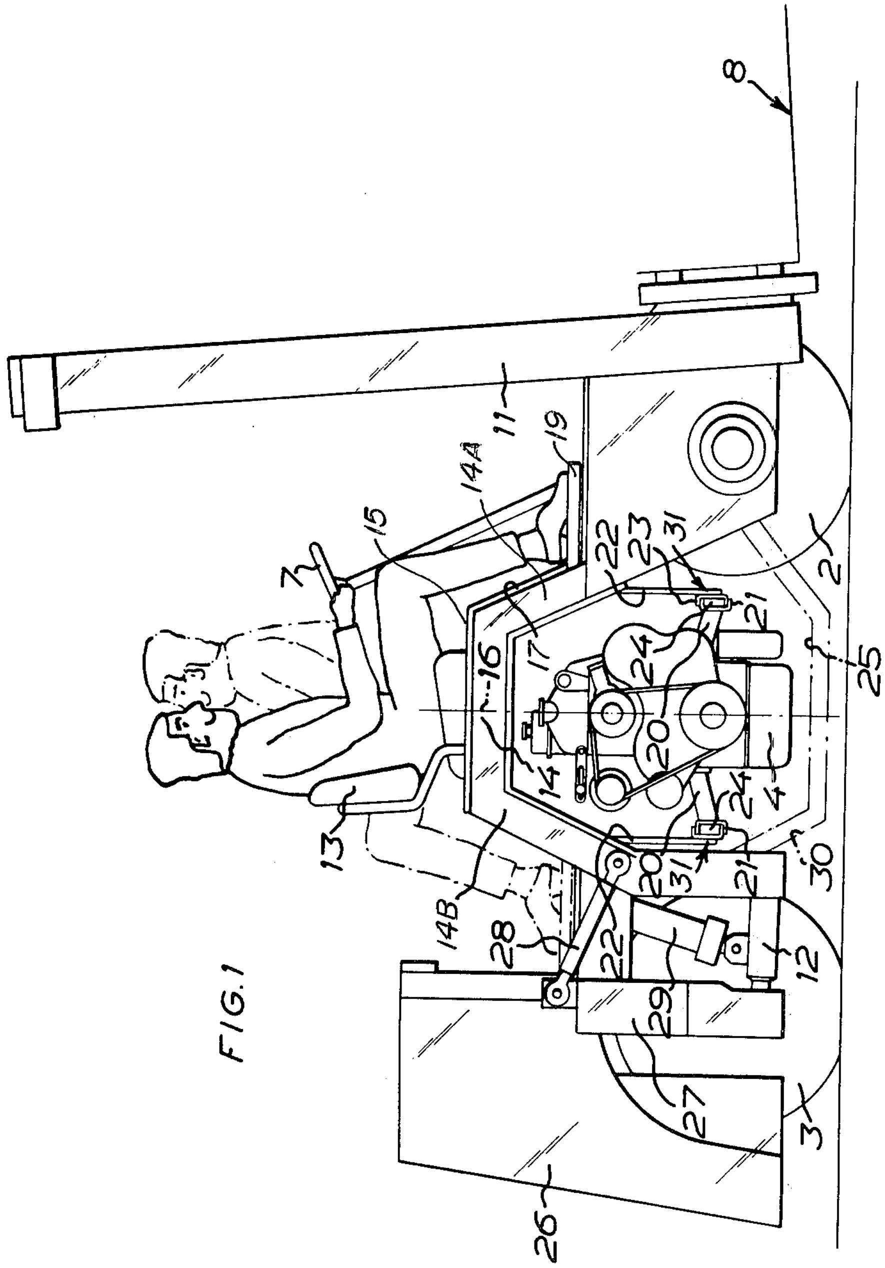
FIG. 1 is a lateral view of a fork lift truck in one position.

The truck illustrated in the drawings comprises a chassis 1 which is supported by two pairs of wheels 2 and 3. The chassis 1 comprises a drive or power means 4 which in the illustrated embodiment is an internal combustion engine. In driving connection with the drive 4 is a hydraulic pump 5 which by means of lines (not shown) is connected on one hand to hydraulic motors (not shown) at two or more of the wheels of said pairs of wheels 2 and 3 for driving said wheels and, on the other hand, to control means 6 provided on a steering wheel 7. At one end of the truck there is mounted a hydraulic fork lift 8 fitted with a hydraulic cylinder and piston unit 9 connected to the pump 5 by lines (not shown) via a control member 10 adjacent the steering wheel 7. The fork lift 8 is vertically movable in known manner along a framework 11. The pump 5 as well as the lines and the hydraulic motors, none of which are shown in the drawings, form part of the transmission means of the truck between the drive 4 and the pairs of wheels 2 and 3. The steering device of the truck is connected via valve means and lines (not shown) to hydraulic cylinder and piston units, one of which is shown at 12 in FIGS. 1 and 2. The truck also has a driver's seat 13.

According to the invention, the chassis 1 has an upper, generally horizontal region or section 14 above the level of the wheels. In the illustrated embodiment, the chassis 1 includes an arch extending from one pair of wheels 2 to the other pair of wheels 3 on one side of the vehicle. For production efficiency, the chassis is built of straight metal sections that have been bent or welded together to form a stable structure and includes the upper section 14 and front and rear, steeply inclined sections 14A and 14B, respectively. The drive 4 is located underneath the highest point or region 14 of the arch-shaped chassis 1 and thus underneath the chassis between the pairs of wheels 2 and 3. At and above the highest point or region 14 of the arch-shaped chassis, the driver's seat 13 and the steering and control means 6, 7, 10 are mounted for pivotal movement in horizontal direction. The seat 13, the steering wheel 7, the control member 10, and the pedals 6 are disposed on a chair-like structure which is pivotal about an axis indicated by dash and dot line 16 and in some suitable manner is mounted on the chassis 1 and fixable in adjusted position by means of locking means (not shown). The required lines from the steering and other conventional control means pass through the pivot center designated 16. The seat 13 is supported on a chair-like structure including a horizontal platform 15 pivotally supported on the upper section 14 of chassis 1 and a downwardly inclined section 17 extending along inclined portions 14A, 14B of the chassis. The inclined portion 17 of the chair structure terminates at its lower end in a generally horizontal foot-rest portion 19 spaced closely above horizontal portion 18 of chassis 1 and below the upper section 14 of the chassis as described hereinbelow.

Figure 3:
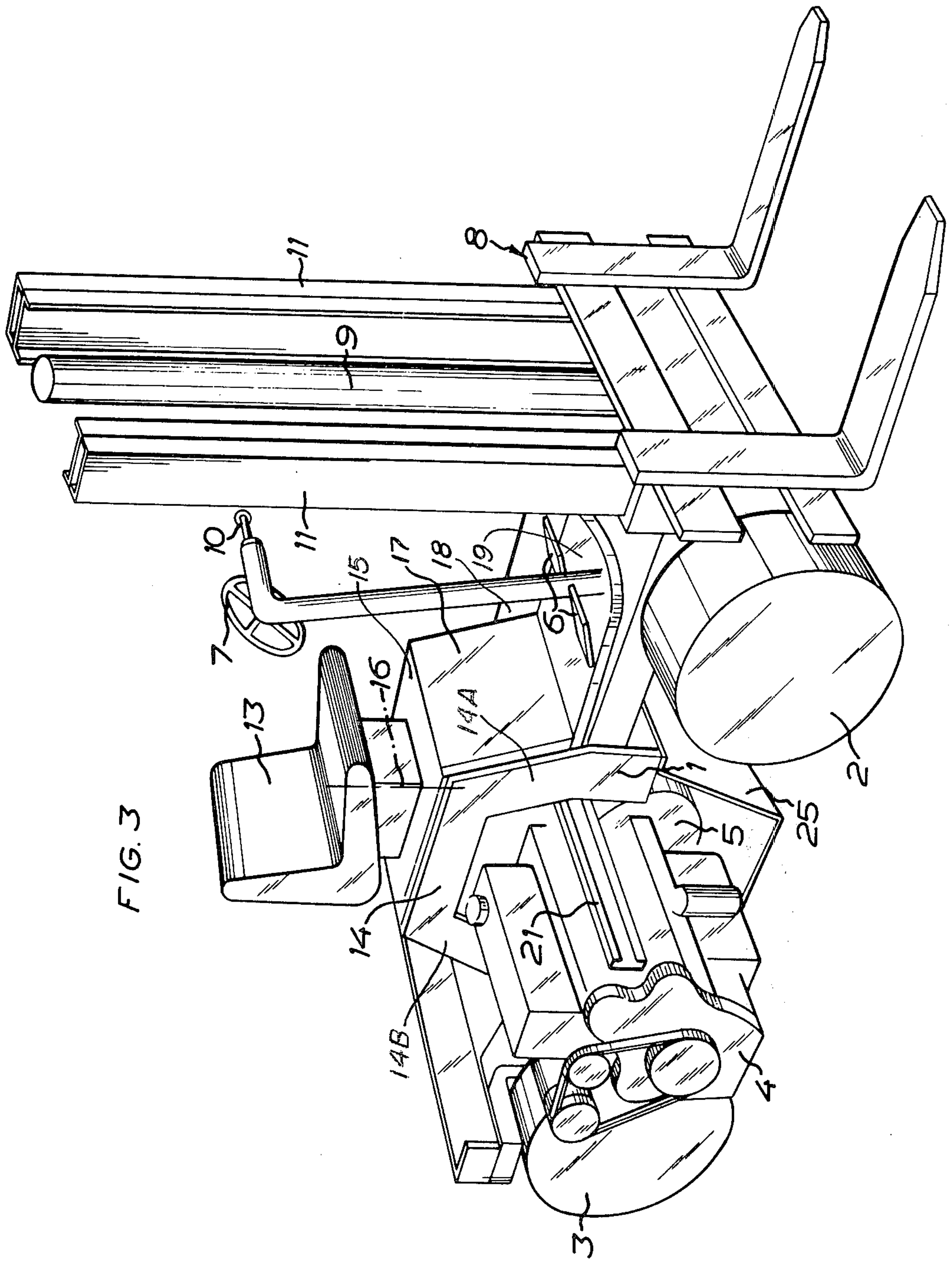
FIG. 3 is a perspective view of the truck.

To be able to swing the chair-like structure 15 within the truck limits determined by the width of the chassis, the chassis 1 is arch-shaped only in the portion 17 lying essentially on one side of the vertical longitudinal median plane of the truck, whereas the portion of the chassis on the other side of said longitudinal median plane, indicated at 18 in FIG. 3, lies on a level with the chassis ends at the pairs of wheels 2 and 3. This makes it possible to pivot the chair-like structure 15 through an arc of substantially 180° between the two end positions indicated in FIG. 1 by respectively full lines and dash and dot lines. The truck driver thus is always comfortably seated, whether he is facing the fork lift 8 or whether he is facing away from it, or in any intermediate position between the truck limits, without said chair-like structure 15 to any essential degree projecting beyond the truck and obstructing its movements. The chair-like support structure, which conforms closely to the configuration of the arc-shaped portion of the chassis, permits a substantial reduction in seat level while still providing a comfortable seating arrangement regardless of the orientation of the seat about axis 16.

The drive 4 is supported by control means 31 in such a manner that it can be displaced from its position underneath the highest point of the arch-shaped chassis 1 to a position essentially laterally of the chassis; FIG. 3. In this manner, the drive 4 can be made accessible for maintenance and repairs. Such accessibility is important and has hitherto been accomplished by the provision of doors above or around the engine room. By the arrangement of the present invention, the drive will not only be adequately protected during operation of the truck; it will also be readily accessible. In addition to these advantages regarding the drive, the special shape of the chassis enables the driver to change from one comfortable sitting position to another equally comfortable position, with unobstructed view of the truck's working area.

The drive 4 is supported by a pair of laterally projecting arms 20 provided at their free ends with U-shaped rails 21. A pair of arms 22 extend downwardly from the underside of the chassis 1 and carry at their free ends second generally U-shaped rails 23. The rails 21 and 22 lie generally opposite one another, and the cavities defined by the rails are facing one another. In the cavities there are provided rollers 24 in rolling contact with the rails 21, 23 to facilitate displacement of the drive 4. The drive 4 is surrounded by a casing 25 (shown in part). Furthermore, the drive may be sound and vibration insulated so that the driver's seat will be adequately protected from the noise and vibrations of the drive. The chair-like structure 15 and thus the seat 13 and the steering and control means 6, 7, 10 are pivotal back and forth through one and the same angle of 180°, which is advantageous also in view of the connections between the drive and the steering and control means.

To counteract the tilting forces to which the truck is subjected when picking up a load with the fork lift 8, the truck at the end opposite the fork has a counterweight 26 which preferably is supported by a special chassis part 27 vertically movably connected with the rest of the chassis by means of links 28, the cylinder and piston units 12 and further cylinder and piston units 29. The unit 29 is connected to the pump 5 via lines (not shown) and control means (not shown) at the driver's seat. The unit 29 serves to move the chassis to the position illustrated in FIG. 2 in which the forks of the fork lift 8 are directed downwardly and facilitate the transfer of a load from the ground to the fork, and vice versa.

Figure 2:
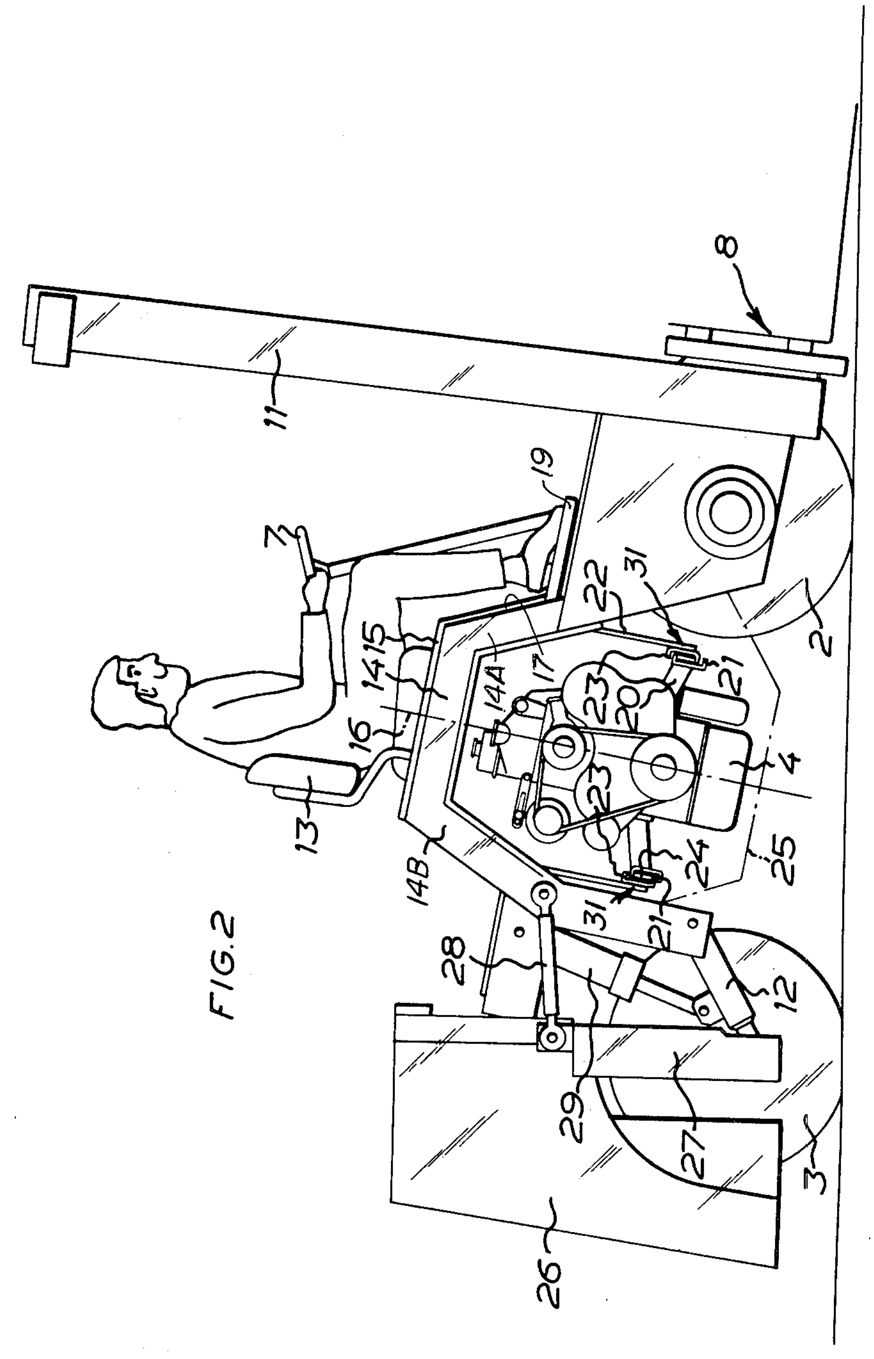
FIG. 2 is a corresponding lateral view of the truck in another position.

A modification of the invention is shown in FIG. 1 by dash and dot lines which designate a frame member 30 connecting the parts of the chassis 1 to the pairs of wheels 2, 3. The frame member 30 constitutes the bottom frame in a cavity defined by the chassis 1 and the frame member 30.

What we claim and desire to secure by Letters Patent is:

1. A fork lift truck of the type including a chassis mounted for movement over a surface by front and rear pairs of wheels, power means for driving the truck, transmission means, a hydraulic fork lift at one end of the chassis, a driver's seat, and steering and control means for controlling operation of the truck, the improvement wherein a portion only of said chassis extending between said front and rear wheels is in the form of an arch including an upper portion which is located between and substantially above the level of said pairs of wheels and steeply sloping front and rear portions, said arch-shaped portion lying essentially on one side of the vertical longitudinal median plane of the truck, the portion of the chassis on the other side of said longitudinal median plane lying substantially on a level with the chassis ends at the pairs of wheels, means mounting said power means underneath said upper portion of said chassis arch and between said pairs of wheels, said driver's seat including a chair-like portion mounted for pivotal movement about a generally vertical axis above said upper portion of said arch, a foot-rest portion spaced substantially below said upper portion of said arch and means joining said foot-rest portion and said chair-like portion and extending in outwardly spaced relation to said steeply sloping portiions of said arch, and said steering and control means being mounted on said driver's seat for pivotal movement therewith about said vertical axis.

2. A truck as claimed in claim 1, wherein the chassis portions at the pairs of wheels are interconnected by a frame member constituting the bottom frame in a cavity defined by the chassis and the frame member.

3. A truck as claimed in claim 1 further including mounting means supporting said power means on said chassis for movement from its position underneath said upper portion of the chassis to a position laterally of the chassis.

4. A truck as claimed in claim 1, wherein the driver's seat and the steering and control means are pivotal back and forth through one and the same angle of 180°.

* * * * *